United States Patent
Trattner et al.

(10) Patent No.: US 9,664,445 B2
(45) Date of Patent: May 30, 2017

(54) TUBULAR REACTOR FOR THERMAL TREATMENT OF BIOMASS

(75) Inventors: Klaus Trattner, Graz (AT); Heinrich Pauli, Graz (AT); Wolfgang Plienegger, Semriach (AT); Wolfgang Janisch, Graz (AT)

(73) Assignee: Global Intelligent Fuel AB, Stockholm (SE)

( * ) Notice: Subject to any disclaimer, the term of this patent is extended or adjusted under 35 U.S.C. 154(b) by 764 days.

(21) Appl. No.: 13/566,140

(22) Filed: Aug. 3, 2012

(65) Prior Publication Data

US 2013/0078589 A1    Mar. 28, 2013

(30) Foreign Application Priority Data

Aug. 5, 2011    (AT) .............................. A 1133/2011

(51) Int. Cl.
| F27B 7/08 | (2006.01) |
| F27B 7/16 | (2006.01) |
| F26B 3/24 | (2006.01) |
| F26B 11/04 | (2006.01) |
| F26B 23/10 | (2006.01) |
| F26B 25/16 | (2006.01) |

(52) U.S. Cl.
CPC .................. *F27B 7/08* (2013.01); *F26B 3/24* (2013.01); *F26B 11/0409* (2013.01); *F26B 11/0445* (2013.01); *F26B 23/10* (2013.01); *F27B 7/16* (2013.01); *F26B 25/16* (2013.01); *F26B 2200/02* (2013.01)

(58) Field of Classification Search
CPC .................................... F27B 7/08; F27B 7/16
USPC .................................................. 432/114, 118
See application file for complete search history.

(56) References Cited

U.S. PATENT DOCUMENTS

| 2,470,315 | A | * | 5/1949 | McGehee | ............... B02C 17/06 |
| | | | | | 241/153 |
| 2,504,156 | A | * | 4/1950 | Ronne | ........................... 366/229 |
| 2,936,220 | A | * | 5/1960 | Schwarting et al. | ......... 422/200 |
| 3,493,344 | A | * | 2/1970 | St Clair | ............................. 165/8 |
| 3,823,487 | A | * | 7/1974 | Cherry | ............................ 34/371 |
| 4,393,603 | A | | 7/1983 | Casperson | |
| 4,659,356 | A | * | 4/1987 | Lawhon | .................... C03B 1/02 |
| | | | | | 432/110 |
| 4,753,019 | A | | 6/1988 | Holopainen | |
| 5,562,053 | A | * | 10/1996 | Lim | .............................. 110/246 |
| 5,673,748 | A | * | 10/1997 | May et al. | ....................... 165/92 |

FOREIGN PATENT DOCUMENTS

SU              792052         12/1980

* cited by examiner

*Primary Examiner* — Alissa Tompkins
*Assistant Examiner* — John Bargero
(74) *Attorney, Agent, or Firm* — Alix, Yale & Ristas, LLP

(57) ABSTRACT

The invention relates to a tubular reactor with a rotating reactor chamber (9) for thermal treatment of biomass. It is characterized by the reactor chamber (9) being subdivided into zones by ring-shaped plates (10). These zones cause the particles to be retained in a particular area and thoroughly mixed there, i.e., the particles being treated are homogenized and the retention time also becomes more homogenous.

21 Claims, 3 Drawing Sheets

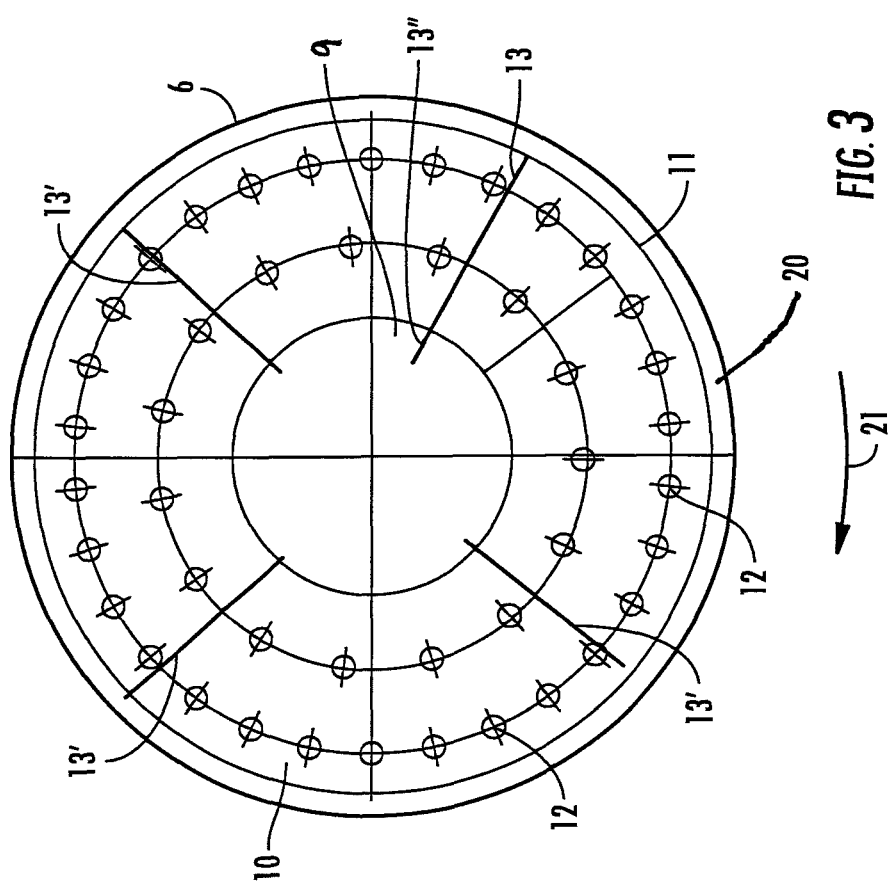

TUBULAR REACTOR FOR THERMAL TREATMENT OF BIOMASS

BACKGROUND

The invention relates to a tubular reactor with a rotating reactor chamber for thermal treatment of biomass.

Reactors of this kind are also known as heated drum reactors. In addition to controlling and checking the process temperature in thermal treatment of biomass, e.g. torrefaction, it is also necessary to control the retention time in the tubular reactor in order to ensure uniform treatment. The retention time distribution should be as narrow as possible in order to obtain a product that is as uniform as possible. In the tubular reactors known, however, the spectrum of retention times, depending on length and speed, is very broad.

SUMMARY

The aim of the invention is, therefore, to provide a drum or tubular reactor that delivers a product that is as uniform as possible.

According to the invention, this is achieved by the reactor chamber being subdivided into zones by means of ring-shaped plates. These zones cause the particles to be retained in a particular area and thoroughly mixed there, i.e. the particles being treated are homogenized. Material (particles) cannot pass into the next chamber or be discharged at the end of the reactor until their height reaches the inner circumference of the ring-shaped plate.

An advantageous further embodiment of the invention is characterized by a conveying tool being secured to at least one plate, where the conveying tool can be mechanically adjustable. As a result, the material is conveyed evenly into the next chamber according to the reactor speed, thus the distribution of retention times for all particles in the chamber becomes more homogenous.

If conveying tools for different directions of rotation are provided on at least one plate, these tools either convey material or convey no material, depending on the direction of rotation. In this way, the reactor can be emptied more quickly by changing the direction of rotation. This also prevents caking and/or overheating of the particles when the reactor is shut down.

A favourable further embodiment of the invention is characterized by a conveying spiral being provided on the shell of the reactor's inner drum. With a conveying spiral of this kind, preferably with a low height, it is possible to empty the reactor completely. If rotated in the opposite direction to the operating direction of rotation of the reactor, this spiral also contributes additional mixing within a zone.

A favourable embodiment of the invention is characterized by heating tubes being arranged in longitudinal (axial) direction in the reactor chamber, where the heating tubes can be arranged in several circular rows, preferably two circular rows, on the reactor's inner drum shell. A heating medium, e.g. flue gas, is fed through these tubes, ensuring on the one hand that the particles are heated evenly and, on the other hand, that they are also well homogenized.

If the rotating reactor chamber is enclosed in an outer reactor drum and an annular gap is provided between the rotating reactor chamber and the outer reactor drum, where the outer reactor drum can rotate together with the reactor chamber, the particles can be heated even better with a large transfer surface area.

BRIEF DESCRIPTION OF THE DRAWING

In the following, the invention is exemplified on the basis of the drawings, where FIG. 3 shows a section through the line marked III-III in FIG. 2.

DETAILED DESCRIPTION

Figure 1:
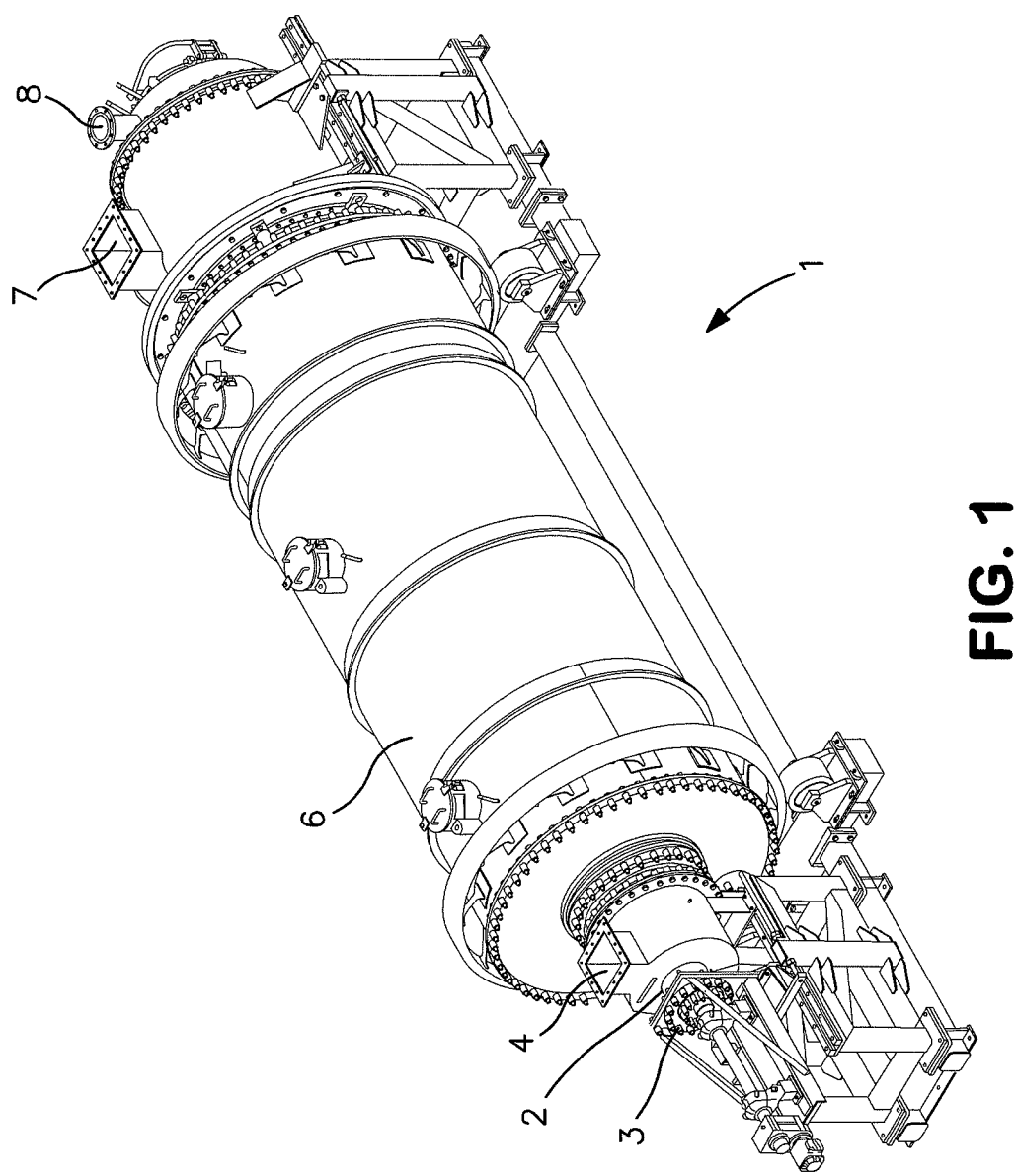
FIG. 1 shows a 3D view of a tubular reactor according to the invention.

FIG. 1 shows a tubular reactor according to the invention. It is designed as an indirectly heated drum reactor 1. The biomass to be treated, e.g. wood chips, is fed through an inlet flange 2 to a heated feed screw 3, which conveys it into the rotating reactor chamber (not shown here). The heating medium—in this case flue gas—is introduced into the reactor chamber and into the gap between the reactor chamber and the reactor's outer drum 6 through the connection 4 at a temperature of approximately 360-450° C. Rotary valves are used before and after the reactor 1 and the cooling screw conveyor, respectively, as seal against the atmosphere.

The cooled heating medium—in this case flue gas—then leaves the drum reactor 1 through the connection 7 at an approximate temperature of 280-300° C. The gas generated by thermal treatment is discharged at the connecting piece 8. If the reactor is used for torrefaction, the torrefaction gas is discharged here.

Figure 2:
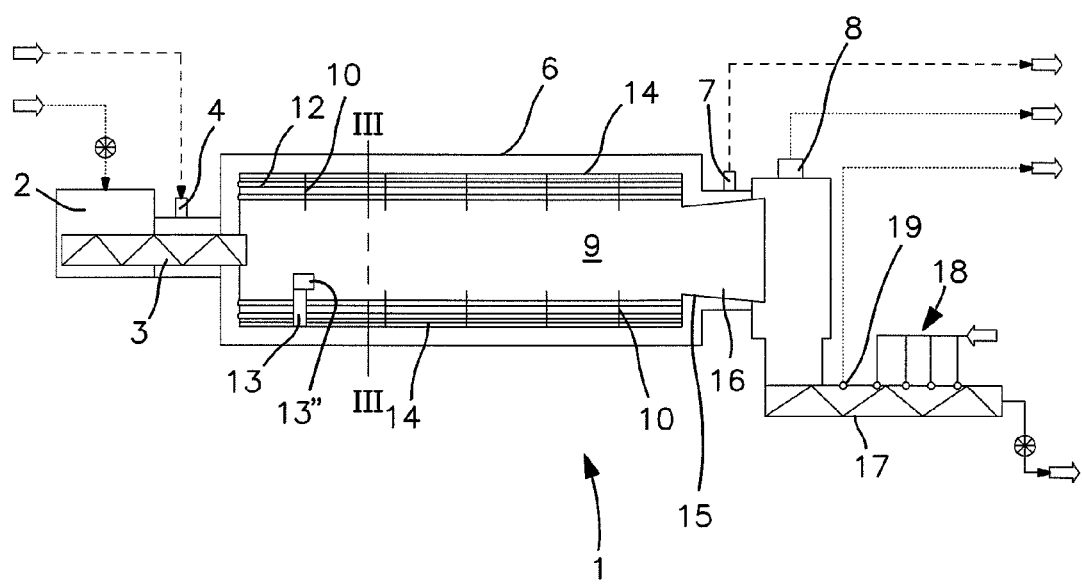
FIG. 2 shows a schematic view of a tubular reactor according to the invention.

FIG. 2 now shows the tubular reactor design according to the invention in a schematic diagram that is used to help describe its mode of operation. The reactor chamber 9 of the drum reactor 1 is divided into several zones by ring-shaped zone plates 10 in order to keep mixing in axial direction to a minimum. In the reactor chamber 9, heat is applied to the input material by means of the inner reactor drum 11 and the heating tubes 12, both of which are heated by flue gas. The process temperature here is approximately 280-300° C. The individual zone plates 10 are fitted with at least one conveying tool 13 on each zone plate 10. The conveying tools 13 transport more or less material over the zone plates 10 towards the reactor outlet 15 depending on the reactor speed and design. The speed here ranges between approximately 8 and 20 rpm.

The conveying tools 13 are specially shaped either to convey material or not convey material, depending on the direction of rotation. In addition, conveying tools 13', preferably several, are provided, which only convey material when rotating in the opposite direction to the operating direction of rotation of the reactor. These can be used to accelerate emptying of the reactor by changing the direction of rotation, thus there can be no caking and also no overheating of the material. This also prevents any outbreak of fire.

In addition to the conveying tools 13, 13', a conveying spiral 14 of low height is mounted, making it possible to empty the reactor completely when rotating in one direction. If it is rotated in the opposite direction, the spiral provides additional mixing within a zone. A certain filling level according to the conveying capacity of the conveying tools 13 is the result. The retention time of the material in the tubular reactor is approximately 20 to 40 minutes.

At the reactor outlet 15, there is a conical tube section 16 attached through which material is conveyed towards the cooling screw 17 independently of the speed.

In the cooling screw 17, very finely atomized water is sprayed onto the hot product through a nozzle system 18 comprising several nozzles. The water volume is controlled by switching single nozzles on and off. A temperature measurement at the screw shell is used as command variable. The water vapour forming is removed through the connection 8 together with the torrefaction gas or through an additional connection 19.

FIG. 3 shows a sectional view along the line marked in FIG. 2 looking towards the reactor inlet. The zone plate 10 and the heating tubes 12 are visible, arranged in this example in two rows, but they can also be arranged in one or several rows. Between the reactor's inner drum shell 11 and outer reactor drum 6 there is a ring-shaped chamber 20 through which flue gas, for example, is directed. As a result, the reactor's inner drum shell 11 heats up, thus enlarging the heat transfer surface area. The conveying tool 13 that conveys the material in the direction of the reactor outlet 15 when rotating in the operating direction of rotation 21 of the reactor is also visible. It would be possible, however, to include several such conveying tools. For rapid emptying, the direction of rotation is reversed and the conveying tools 13' (this figure shows three) convey the material out of the respective zone rapidly and completely. Several conveying tools may also be provided here, however the number of conveying tools 13' for emptying must always be (much) larger than the number of conveying tools 13 to control the retention time in normal operation. The portion of conveying tool 13 that projects into the center of the ring shaped zone plates 10, is indicated at 13". As an example, the conveying tool 13 (and also the conveying tools 13') can be considered as a steel strip which passes into the material and due to the rotation takes particles with it to push over the edge of the ring shaped zone plates 10 by extension 13" into the next zone.

The invention claimed is:

1. A tubular reactor for thermal treatment torrefaction of solid biomass material into bio-coal, comprising: a rotatable reactor drum extending longitudinally along a material flow axis, wherein said reactor drum defines an internal reactor chamber (9) having a chamber wall (11), an inlet end (2, 3) and an outlet end (7, 8); a system (4) for indirectly (7, 8) heating the reactor chamber that includes heating tubes (12) arranged longitudinally in the reactor chamber (9) with a heating medium passing through the tubes; a feeder device (3) for delivery of untreated solid material into the inlet end of the reactor chamber; a discharge opening (16) for removal of torrefied bio-coal material that has passed from the inlet end to the outlet end of the reactor chamber; wherein the reactor chamber is subdivided into a longitudinal series of reaction zones by a plurality of longitudinally spaced apart ring-shaped plates (10) having a radially inner edge; whereby in each zone the material accumulates and is thermally treated by the indirect heat while retained by said plates until mechanically transported intermittently over the inner edge of a respective plate into a next zone of the series of zones.

2. The tubular reactor according to claim 1, wherein a conveying tool (13, 13') is secured to at least one plate (10).

3. The tubular reactor according to claim 2, wherein the conveying tool (13, 13') is mechanically adjustable.

4. The tubular reactor according to claim 2, wherein conveying tools (13, 13') for different directions of rotation are provided on at least one plate (10).

5. The tubular reactor according to claim 1, wherein the reactor has outer and inner drums including respective outer and inner shells, and a conveying spiral (14) is provided on the shell (11) of the inner drum.

6. The tubular reactor according to claim 1, wherein the reactor has outer and inner drums including respective outer and inner shells, and the heating tubes (12) are arranged in at least two circular rows, on the inner drum shell.

7. The tubular reactor according to claim 1, wherein the rotating reactor chamber (9) is enclosed in an outer reactor drum (6) and an annular indirect heating gap (20) is provided between the rotating reactor chamber (9) and the outer reactor drum (6).

8. The tubular reactor according to claim 7, wherein the outer reactor drum (6) rotates together with the reactor chamber (9).

9. The tubular reactor according to claim 3, wherein a conveying tool is provided on each plate and conveying tools for different directions of rotation are provided on at least one plate (10).

10. The tubular reactor according to claim 2, wherein the reactor has outer and inner drums including respective outer and inner shells, and a conveying spiral (14) is provided on the shell (11) of the inner drum.

11. The tubular reactor according to claim 2, including heating tubes (12) arranged longitudinally in the reactor chamber (9).

12. The tubular reactor according to claim 5, including heating tubes (12) arranged longitudinally in the reactor chamber (9).

13. The tubular reactor according to claim 12, wherein the reactor has outer and inner drums including respective outer and inner shells, and the heating tubes (12) are arranged in at least two circular rows, on the inner drum shell (11).

14. The tubular reactor according to claim 2, wherein the rotating reactor chamber (9) is enclosed in an outer reactor drum (6) and an annular indirect heating gap (20) is provided between the rotating reactor chamber (9) and the outer reactor drum (6).

15. The tubular reactor according to claim 14, wherein the outer reactor drum (6) rotates together with the reactor chamber (9).

16. The tubular reactor according to claim 1, wherein the rotating reactor chamber (9) is enclosed in an outer reactor drum (6) and an annular indirect heating gap (20) is provided between the rotating reactor chamber (9) and the outer reactor drum (6).

17. The tubular reactor according to claim 16, wherein the outer reactor drum (6) rotates together with the reactor chamber (9).

18. A tubular reactor for torrefaction of solid biomass material into bio-coal, comprising: a rotatable outer drum (6) extending longitudinally along a material flow axis from an inlet end to an outlet end; an inner, longitudinally extending, reactor drum (11) radially spaced within the outer drum and operatively connected to the outer drum for co-rotation around the material flow axis, wherein said reactor drum defines an internal reactor chamber (9) having an inlet end and an outlet end; an indirect heating system for delivering hot gas into the radial space between the outer drum and the reactor drum, whereby said reactor chamber is indirectly heated; a feeder device (3) for delivery of untreated solid biomass material into the inlet end of the reactor chamber; a discharge opening (16) for removal of bio-coal from the outlet end of the reactor chamber; wherein the reactor chamber is subdivided into longitudinal zones by a plurality of longitudinally spaced apart ring-shaped plates (10); the indirect heating system includes a plurality of heated tubes with a heating medium passing within that pass longitudinally through the drum and transversely intersect the plates; and through a series of said zones, the delivered untreated solid material accumulates and is thermally chemically reacted only by said indirect heating system while being mixed by said heated tubes before passing longitudinally over said plates from the inlet end to the outlet end of the reactor chamber (9).

19. The tubular reactor according to claim 18, wherein centrifugal force arising from the corotation of the drums urges the material in the reactor chamber against the reactor drum whereby an open central space extends longitudinally along the flow axis and said plates have a radially inner edge that extends into said open space; and the thermally treated solid material passes through the series of zones by retention and accumulation against a given plate in a given zone until the accumulated material overflows the edge of said given plate into the next zone.

20. The tubular reactor according to claim 19, wherein a conveying tool (13, 13') is secured to at least one plate (10) for passing said accumulated material longitudinally over said at least one plate.

21. The tubular reactor according to claim 20, wherein the conveying tool (13, 13') is mechanically adjustable.

* * * * *